United States Patent [19]

Nakagawa et al.

[11] Patent Number: 4,864,347
[45] Date of Patent: Sep. 5, 1989

[54] PROGRAM SHUTTER

[75] Inventors: Tadashi Nakagawa; Nobuo Shinozaki; Shigeru Tagami; Youichi Seki, all of Yotsukaido, Japan

[73] Assignee: Seikosha Co., Ltd., Tokyo, Japan

[21] Appl. No.: 176,942

[22] Filed: Apr. 4, 1988

[30] Foreign Application Priority Data

Apr. 2, 1987 [JP] Japan .................................. 62-81641

[51] Int. Cl.⁴ ............................................. G03B 7/097
[52] U.S. Cl. ..................................................... 354/439
[58] Field of Search ............... 354/435, 436, 437, 439, 354/456, 458

[56] References Cited

U.S. PATENT DOCUMENTS 4,720,726 1/1988 Sato et al. ............................ 354/439
4,743,934 5/1988 Yoshida et al. ...................... 354/439
4,763,155 8/1988 Oda et al. ............................ 354/435

Primary Examiner—W. B. Perkey
Attorney, Agent, or Firm—Bruce L. Adams; Van C. Wilks

[57] ABSTRACT

A program shutter has a plurality of shutter sectors driven in opening and closing directions by a reversible stepping motor to define a lens aperture during an exposure operation. An arithmetic circuit calculates an exposure amount corresponding to the brightness of the object being photographed, and a counting circuit outputs a pulse count corresponding to the number of steps through which the stepping motor should be rotated based on the calculated exposure amount. A pulse circuit produces driving pulses equal in number to the number of steps determined by the counting circuit, and a time circuit determines the ON/OFF periods of the driving pulses based on the calculated exposure amount. The driving pulses are applied to the stepping motor through a driving circuit to accordingly drive the shutter sectors in the opening and closing directions during the exposure operation.

1 Claim, 4 Drawing Sheets

PROGRAM SHUTTER

BACKGROUND OF THE INVENTION

The present invention relates to a program shutter and, more particularly, to a program shutter in which sectors are opened and closed by means of a stepping motor.

A program shutter in which sectors are opened and closed by means of a stepping motor is arranged such that, in response to the operation of a release button, driving pulses having a predetermined period are input to the stepping motor so as to cause it to rotate forwardly, thereby gradually opening the sectors, and at the time when the motor has rotated through a number of steps corresponding to a particular amount of exposure, the phase of the driving pulses is switched to reverse the stepping motor so as to close the sectors, thus obtaining a correct exposure.

The shutter wherein the sectors are opened and closed by means of a stepping motor as described above suffers from the following problems. When the shutter is in a stationary state, a sector opening and closing member is forced to remain at a reference position by means of a spring in order to prevent occurrence of an erroneous operation. Accordingly, in the process of opening the sectors, the load of the spring is applied to the stepping motor. In addition, the change of the aperture diameter with respect to the elapsed time in the process of opening the sectors is non-uniform due to the inertia of components or the fit clearance therebetween. For these reasons, the prior art is incapable of effecting precise exposure thereof.

SUMMARY OF THE INVENTION

It is an object of the present invention to provide a program shutter which is so designed that it is possible to make uniform the change in the aperture diameter defined by the sectors when opening.

To attain the above-described object, according to the present invention, when a shutter mechanism which has sectors defining a lens aperture and a reversible stepping motor used to open and close the sectors is driven by means of pulses having a predetermined period, the ON/OFF periods in the driving pulse period are appropriately set for each pulse and the stepping motor is driven with these pulses, thereby making uniform the change in the aperture.

DETAILED DESCRIPTION OF THE INVENTION

The present invention will be described hereinunder in detail by way of one embodiment and with reference to the accompanying drawings.

Figure 1A:
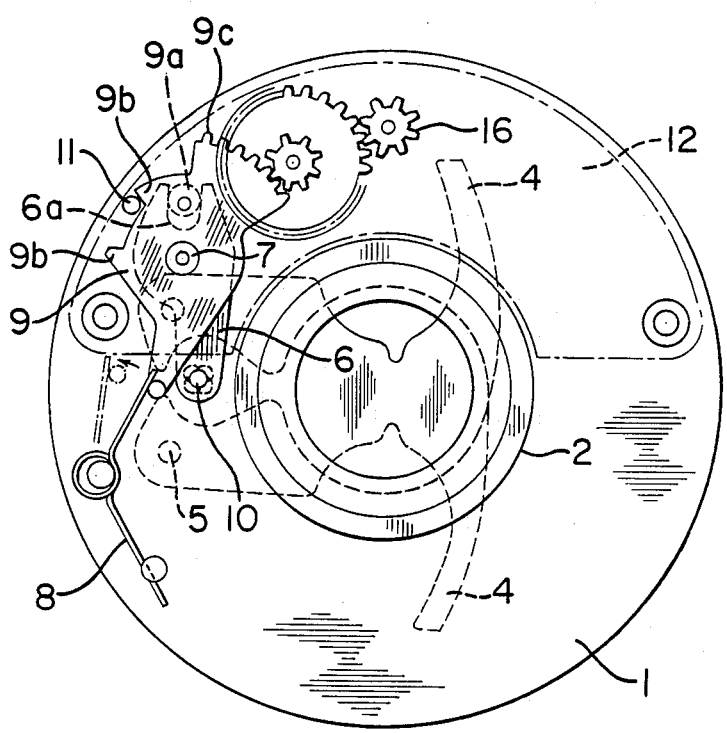
FIGS. 1(a) and 1(b) are front and sectional views, respectively, showing one example of a shutter mechanism which may be used in the present invention.
Figure 1B:
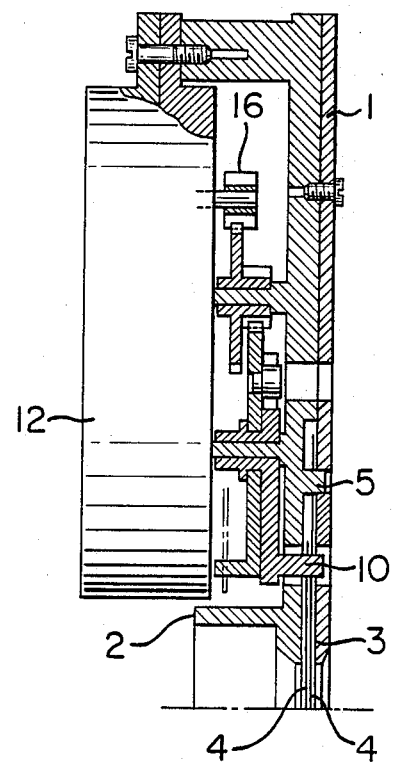

Referring to FIG. 1, which shows one example of a shutter mechanism to which the present invention may be applied, the reference numeral 1 denotes a base plate having a lens positioning plate 2 secured thereto. A sector chamber 3 is defined between the base plate 1 and the lens positioning plate 2. Two sectors 4 are pivotally provided in the sector chamber 3 through respective pins 5, the sectors 4 pivoting symmetrically to determine a lens aperture. The numeral 6 denotes a sector driving lever which is pivotally supported on the base plate 1 through a shaft 7 which is built therein. The lever 6 is engaged through a groove portion 6a formed at one end thereof with a pin 9a of a sector driving wheel 9 (described later) which is pivotally provided on the shaft 7. The lever 6 is also engaged with the sectors 4 through a sector pin 10 which is built in the side thereof which is closer to the base plate 1. The numeral 9 denotes the above-described sector driving wheel which is pivotally supported by the shaft 7 in such a manner that the sector driving wheel 9 is, when in a stationary state, held at a reference position by means of stopper portions 9b formed on the outer periphery thereof and a spring 8 which biases the wheel 9 so as to turn counterclockwise. The sector driving wheel 9 is connected at a toothed portion 9c formed at one end thereof to a driving shaft 13a of a stepping motor 12 (described later) through a gear train.

It should be noted that the reference numeral 11 in the figure denotes a pin which is adapted to engage with either one or the other of the stopper portions 9a of the sector driving wheel 9 to thereby limit the range within which the wheel 9 can rotate.

Figure 2A:
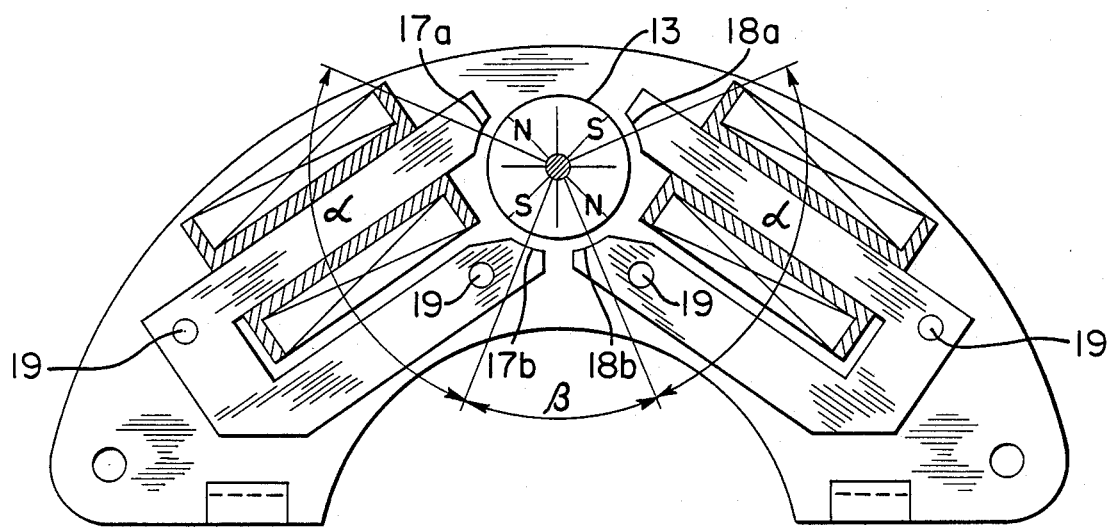
FIG. 2(a) and 2(b) are front and sectional views, respectively, of one example of a stepping motor which may be used in the present invention.
Figure 2B:
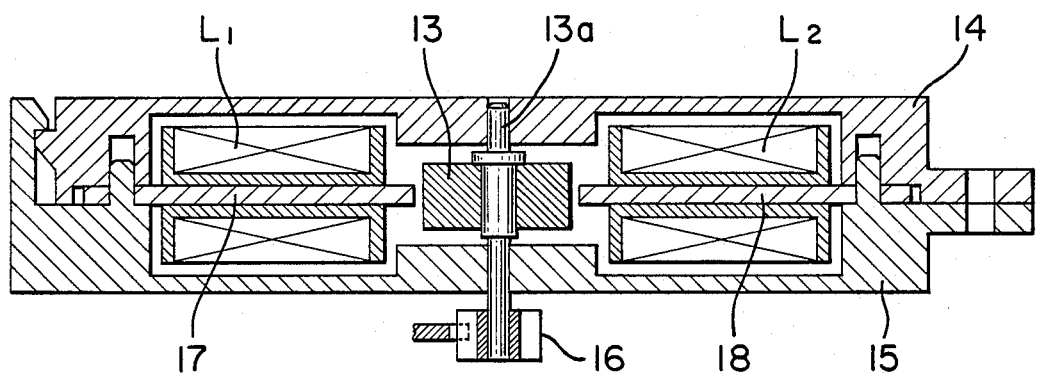

Referring next to FIG. 2, which shows on example of the above-described stepping motor 12, the reference numeral 13 denotes a quadripole rotor made of permanent magnets which is rotatably attached to upper and lower plates 14, 15 with one end of the rotor shaft 13a projecting from the lower plate 15, so that the sector driving wheel 9 of the shutter mechanism is driven through a pinion 16 which is secured to the projecting end of the rotor shaft 13a. The numerals 17 and 18 denote stators each made of a U-shaped magnetic material having two leg portions. Each of the stators 17, 18 has an exciting coil $L_1$, $L_2$ wound on one leg portion thereof, and each stator has two magnetic pole portions 17a, 17b, or 18a, 18b, provided at its distal end in such a manner that the two magnetic pole portions are in 90° relation to each other with respect to the central axis of the rotor 13. The stators 17 and 18 are positioned by means of guide pins 19 so that one magnetic pole portion 17b of the stator 17 and one magnetic pole portion 18b of the stator 18 are in 45° relation to each other with respect to the central axis of the rotor 13. Thus, the stepping motor 12 is arranged so that the rotor 13 can be rotated both forwardly and reversely through steps each set at 90°.

The following is a description of a controller which is characteristic of the present invention.

Figure 3:
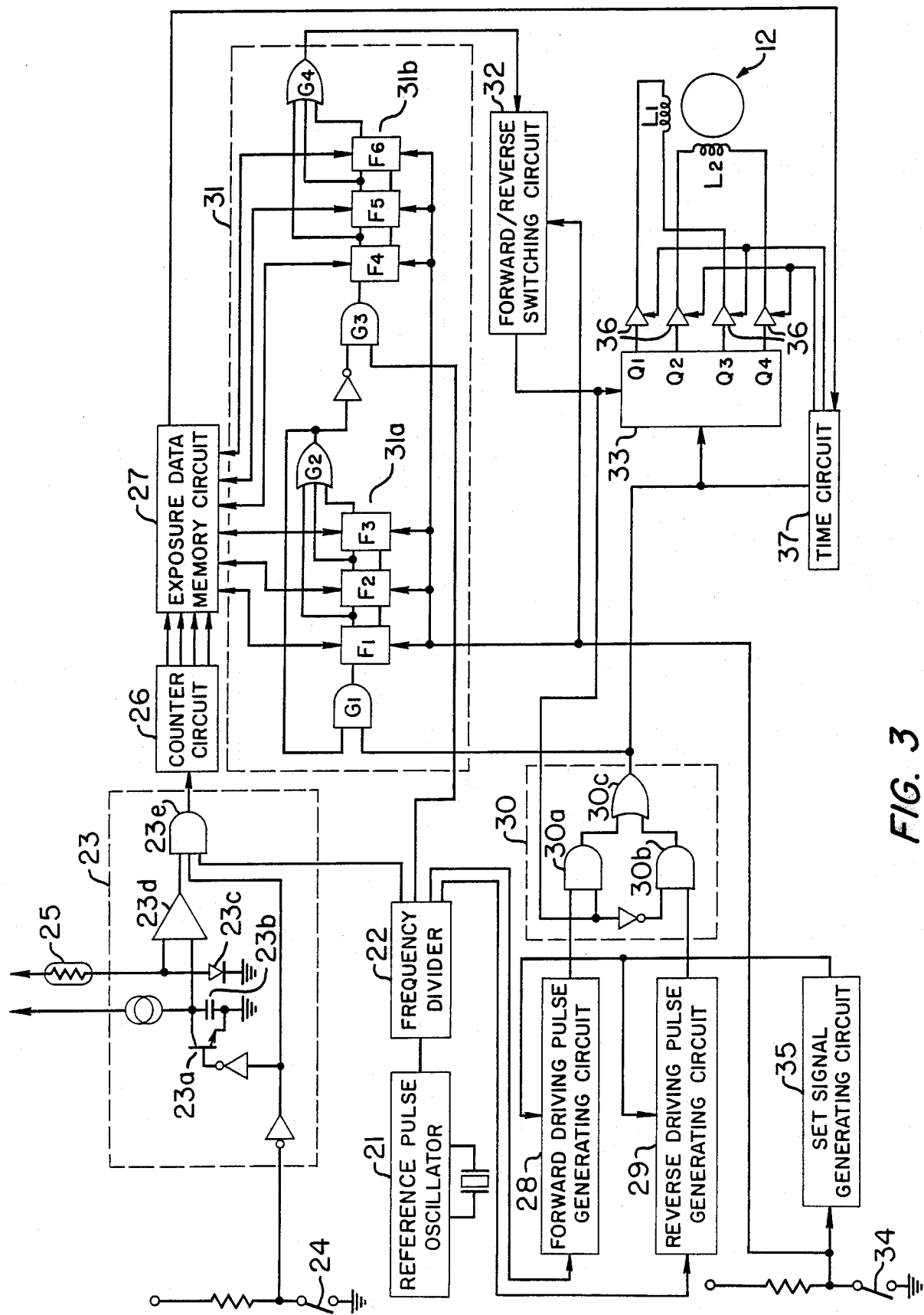
FIG. 3 is a block diagram of one example of a shutter controller according to the present invention.

Referring to FIG. 3, which shows one example of a controller, the reference numeral 22 denotes a frequency divider which steps down a signal from a reference pulse oscillator 21 having a crystal oscillator in a predetermined ratio to generate clocks CK1 for digitizing photometric data, stepping motor driving clocks CK2, CK3, and interpolation clocks CK4. The numeral 23 denotes a brightness detecting circuit which makes comparison by means of a comparator 23d between a charging voltage from a capacitor 23b which is charged with a constant current through a transistor 23a which is turned ON/OFF by a switch 24 actuated in response to the operation of a release button (not shown) and a terminal voltage of a logalithmic compression diode 23c which is connected in series to a light-receiving element 25 such as a CdS or the like. When the switch 24 is actuated, the brightness detecting circuit 23 opens a gate 23e to output clocks CK1 to a counter circuit 26 (described later). Also when the output of the comparator 23d is inverted, the gate 23e is opened to output clocks CK1 to the counter circuit 26, and when the output of the comparator 23d is inverted, the gate 23e is closed to suspend the output of the clocks CK1, thereby outputting a digitized subject brightness signal. The numeral 26 denotes the above-described counter circuit which is cleared in response to the operation of the switch 24 and, at the same time, activated to count the subject brightness data output from the brightness detecting circuit 23 and output the contents thereof. The numeral 27 denotes an exposure data memory circuit storing stepping motor driving data corresponding to various subject brightnesses. The memory circuit 27 is arranged such that it is possible to access data on a particular number of steps through which the stepping motor should be rotated and interpolation data for correcting an exposure error resulting from said number of steps in accordance with the contents of the counter circuit 26. The memory circuit 27 further stores data used to determine ON/OFF periods in the driving pulse period for each step. This data is read out by a time circuit 37 (described later) when ON/OFF periods are set for drive circuits 36. The numeral 28 denotes a forward driving pulse generating circuit which generates on the basis of the stepping motor driving clocks CK2 pulses $P_1 \ldots P_n$ whereby the stepping motor can be driven forwardly against the load of the position control spring 8 (see FIG. 1) of the shutter mechanism. The forward driving pulse generating circuit 28 is suspended to output the pulses in response to the inversion of the output of a forward/reverse switching circuit 32 (described later). The numeral 29 denotes a reverse driving pulse generating circuit which outputs pulses $Q_1 \ldots Q_n$ for driving the stepping motor reversely on the basis of the stepping motor driving clocks CK3 from the time when the output of the forward/reverse switching circuit 32 is inverted. The numeral 30 denotes a pulse switching circuit which consists of AND gates 30a, 30b and an OR gate 30c which connects together these AND gates. The AND gate 30a is supplied at one end thereof with the pulses Pn from the pulse generating circuit 28 and at the other end with a signal output from the forward/reverse switching circuit 32, and the AND gate 30b is supplied with at one end thereof with the pulses Qn from the pulse generating circuit 29 and at the other end with a signal obtained by inverting the signal from the forward/reverse switching circuit 32. When the stepping motor is rotated forwardly, the pulse switching circuit 30 outputs the pulses Pn, whereas, when the motor is reversed, the circuit 30 outputs the pulses Qn. The numeral 31 denotes a rotation mode switching counter which consists of a first presettable down counter 31a composed of flip-flops $F_1$ to $F_3$ cascade-connected to each other and a second presettable down counter 31b composed of cascade-connected flip-flops $F_4$ to $F_6$. The first counter 31a is preset with a number of steps delivered from the exposure data memory circuit 27 when the forward rotation of the pulse motor is started and when the motor is reversed. The first counter 31a is decremented by one in response to each pulse P or Q, and when the count reaches zero, the counter 31a outputs a signal from an output gate $G_2$. On the other hand, the second counter 31b is preset with interpolation data delivered from the exposure data memory circuit 27 when the forward rotation of the pulse motor is started. The counter 31b is decremented by one in response to each interpolation clock CK4 from the time when the count of the first counter 31a reaches zero, and when the count of the second counter 31b reaches zero, it outputs a signal from an output gate $G_4$. It should be noted that data used to determine the width of each of the pulses $P_1$ to $P_n$ and $Q_1$ to $Q_n$ is transferred from the memory circuit 27 to either the forward driving pulse generating circuit 28 or the reverse driving pulse generating circuit 29 in response to the output of the counter 31a or 31b immediately before the generation of the pulse.

The numeral 32 denotes a forward/reverse switching circuit which latches a signal output from the mode switching counter circuit 31, activates the pulse switching circuit 30 to switch over the output pulses from the pulses P to the pulses Q and, at the same time, switches over the pulse movement direction determined in a stepping motor driving circuit 33 (described hereinafter). The numeral 33 denotes the above-described stepping motor driving circuit which is defined by a so-called ring counter in which a terminal from which a signal is output is shifted to another terminal which is adjacent to it every time a pulse signal is input thereto. The stepping motor driving circuit 33 is supplied with pulses from the pulse switching circuit 30 and activated in response to a signal output from the forward/reverse switching circuit 32 to switch over the direction of movement of pulses so as to rotate the stepping motor forwardly or reversely.

It should be noted that the reference numeral 34 in the figure denotes a second switch which resets both the rotation mode switching counter 31 and the forward/reverse switching circuit 32 in response to the operation of the release button, 35 a set signal generating circuit which sets the pulse generating circuits 28, 29 in response to the operation of the switch 34, 36 drive circuits which respectively amplify signals output from output terminals $Q_1$ to $Q_4$ of the stepping motor driving circuit 33 and feed the amplified signals to the exciting coils $L_1$, $L_2$ of the stepping motor, and 37 a time circuit which sets ON/OFF periods for each of the drive circuits 36 on the basis of the data concerning ON/OFF periods in the driving pulse period for each step which is stored in the memory circuit 27.

The operation of the apparatus arranged as described above will next be described with reference to the timing chart shown in FIG. 4.

A power supply switch (not shown) is turned ON, and the release button provided on the camera body is then pressed as far as a first position. In consequence, the first switch 24 is turned ON, and the subject brightness detecting circuit 23 is thus activated to output a number of clocks CK1 which corresponds to the brightness of the subject, the brightness data thus obtained being stored in the counter 26. The exposure data memory circuit 27 outputs on the basis of the brightness data delivered from the counter 26 a number of steps by which the required exposure is obtained and an interpolation quantity for compensating for the rotation of the stepping motor effected on the basis of said number of steps to the first and second down counters 31a, 31b, respectively, in the rotation mode switching counter circuit 31 to preset these down counters, thereby setting exposure data corresponding to the detected subject brightness.

After the completion of the above-described setting, the release button is pressed as far as a second position. In consequence, the switch 34 is turned ON, and both the rotation mode switching counter 31 and the forward/reverse switching circuit 32 are thus reset and, at the same time, both the forward driving pulse generating circuit 28 and the reverse driving pulse generating circuit 29 are activated to generate pulses P and Q, respectively. The pulse switching circuit 30 selects the pulses P and outputs them to the first counter 31a in the rotation mode switching counter 31 and to the stepping motor driving circuit 33. On the other hand, the time circuit 37 sets data delivered from the memory circuit 27 on the basis of the subject brightness data output from the brightness detecting circuit 23 and also sets ON/OFF periods for the drive circuits 36. Every time one pulse P is input, energizing time data for compensating for the effects of the load of the spring 8 (see FIG. 1), the inertia of the shutter mechanism, backlash attributable to the fit clearance, etc. is output from the memory circuit 27 to the time circuit 37, and the stepping motor 12 is thus rotated one step forwardly, causing the sectors 4 to open with a relationship such as that shown by the solid line in FIG. 4(a). At the same time, the first down counter 31a is decremented by one.

Figure 4A:
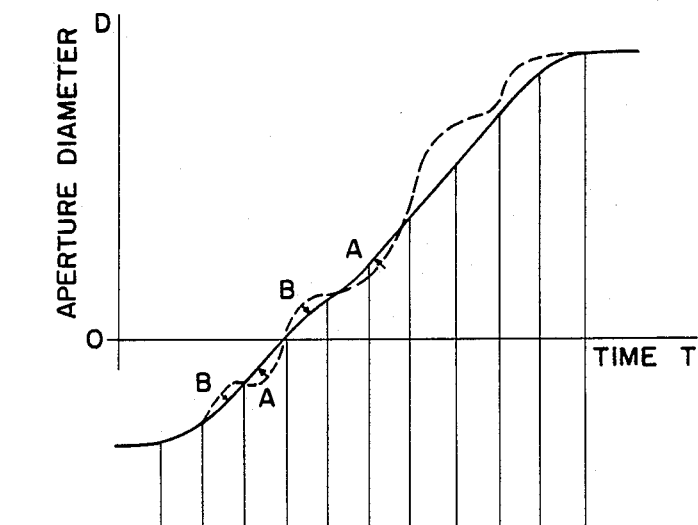
FIGS. 4(a) 4(b) show the operation of the controller shown in FIG. 3.
Figure 4B:
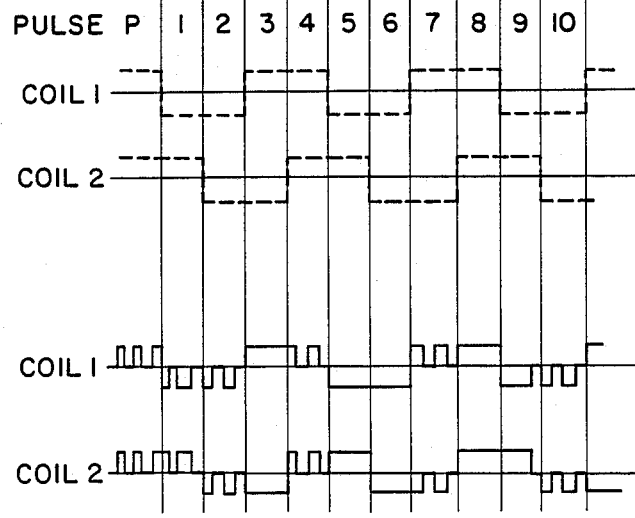

More specifically, in the prior art the stepping motor is driven with pulses P whereby energization is continued throughout one period as shown by the chain line in FIG. 4(b) and therefore hunting occurs due to the inertia of components of the shutter mechanism and the fit clearance therebetween as shown by the chain line in FIG. 4(a), resulting in non-uniform change of the separate diameter with respect to the elapsed time. In the present invention, however, the memory circuit 27 designates ON/OFF periods set previously in conformity with the above-described factors as shown by the solid line in FIG. 4(b). Accordingly, the sectors 4 are activated with a relationship such as that shown by the solid line in FIG. 4(a).

In other words, pulses $P_3$, $P_5$, $P_6$ and $P_8$ in the present invention are set with relatively long ON periods for the purpose of correcting the non-uniform aperture diameter shown by the chain line in FIG. 4(a) into the uniform aperture diameter shown by the solid line, so that the sectors 4 are moved rapidly in the direction of the arrow A. On the other hand, pulses $P_2$, $P_4$, $P_7$ and $P_{10}$ are set with relatively short ON periods for the purpose of similarly correcting the non-uniform aperture diameter shown by the chain line in FIG. 4(a) into the uniform aperture diameter shown by the solid line, so that the the sectors 4 are moved gently in the direction of the arrow B.

In this way, the operation proceeds, and when the pulse Pn the number of which is coincident with the number of pulses which has been preset in the first down counter 31a is input, interpolation clocks CK4 are input to the second counter 31b from the gate G3 with the stepping motor kept rotating toward the final step.

When a clock CK4 the number of which is coincident with the number preset in the second counter 31b is input, the forward/reverse switching circuit 32 is inverted so as to instruct the pulse switching circuit 30 to output pulses Qn. At the same time, the forward/reverse switching circuit 32 switches the stepping motor driving circuit 33 to the reverse drive position. In consequence, the pulses Q from the pulse switching circuit 30 are input to the driving circuit 33, and the stepping motor is forcedly reversed, so that the sectors 4 are pivoted reversely in synchronism with the pulses Q by the cooperation of the stepping motor and the counterclockwise turning force stored in the position control spring 8. Thus, the sectors 4 are closed. In the case of the pulses Q also, ON periods are designated by the time circuit 37 so that operation characteristics are compensated for on the basis of the output from the memory circuit 27 in the same way as in the case of the forward rotation. When the count of the first counter 31a reaches zero again, the sectors 4 return to the previous positions to close the optical path.

Upon the completion of the above-described operation, the AND gate 30b is activated through the NAND gate $G_5$ in response to the output signal from the forward/reverse switching circuit 32 and the inverted output signal from the OR gate $G_2$, so that no reverse driving pulses are output from the OR gate 30c. Accordingly, the motor 12 is suspended, and the release button returns to the previous position to open the switch 24, thus making ready for a subsequent operation of taking a picture.

Although in the foregoing description the ON periods are correct such that the ON periods for the pulses $P_3$, $P_5$, $P_6$ and $P_8$ are increased while the ON periods for the pulses $P_2$, $P_4$, $P_7$ and $P_{10}$ are reduced, the present invention is not necessarily limited thereto, and the direction in which correction is made, the extent to which a particular pulse is corrected, etc. may be decided on the basis of data set in the memory circuit 27 with experimental operation characteristics being taken into consideration.

Further, it is also possible to set constant ON/OFF periods for all the pulses, or increase or decreases the ON/OFF periods in conformity with the operation characteristics of each individual shutter.

It is not always necessary to correct the pulses Q if the operation is stabilized without making correction thereof.

As has been described above, according to the present invention, ON periods for predetermined pulses are corrected in conformity with the operation characteristics of the shutter mechanism, thereby making uniform the change of the aperture diameter with respect to the elapsed time in the process of opening the sectors and also permitting the sectors to operate smoothly. Accordingly, it is possible to effect high-precision exposure control with respect to the subject brightness. In addition, when a picture is taken using a flash also, it is possible to synchronize the shutter with the flash bulb at an optimal aperture diameter corresponding to the subject distance. Thus, high-precision control can be effected.

Since the movement of the sectors is smooth, the reliability in the exposure operation can be enhanced.

When the shutter is not used, the supply of power to the drive circuit which has a relatively high rate of power consumption is cut off. Therefore, it is possible to suppress the consumption of the battery and hence provide a small-sized camera which is loaded with a small-sized battery.

What is claimed is:

1. A program shutter comprising: a shutter mechanism having sectors defining a lens aperture during an exposure operation and a reversible stepping motor for opening and closing said sectors; and a control section including arithmetic circuit means for calculating an amount of exposure corresponding to a subject brightness, counting means for outputting a number of steps through which said stepping motor should be rotated in accordance with the calculated amount of exposure, pulse circuit means for outputting pulses having a predetermined period for driving said shutter mechanism in correspondence with the number of steps output from said counting means, a time circuit for setting ON/OFF periods in said period of the pulses output from said pulse circuit means on the basis of the data obtained from said arithmetic circuit means, and driving circuit means for rotating said motor both forwardly and reversely in response to the pulse output from said pulse circuit means.

* * * * *